Figure 1:
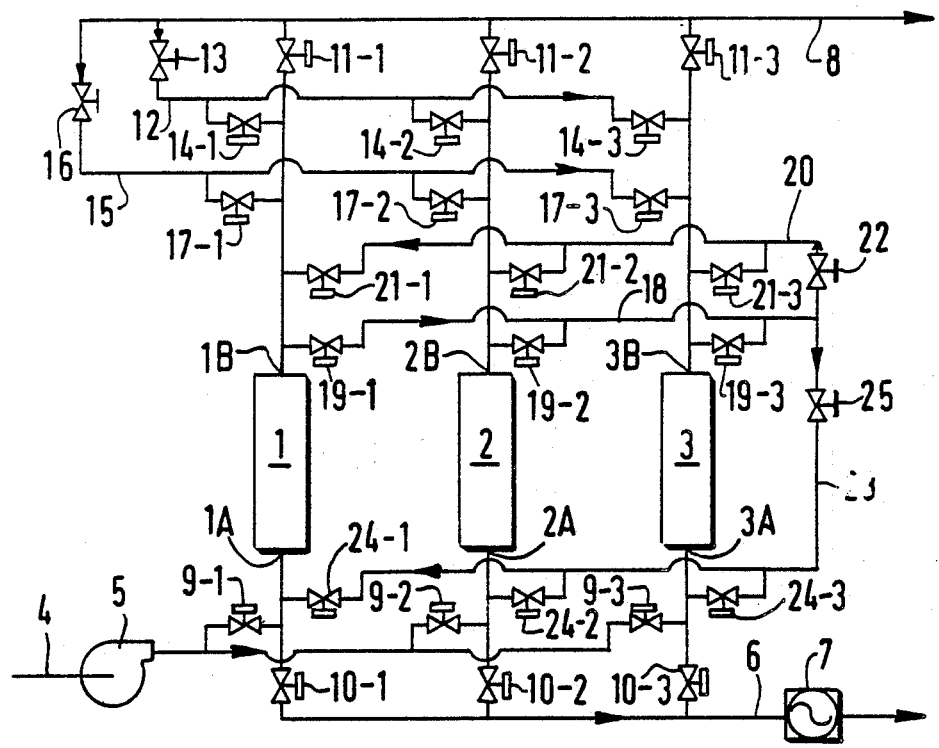

United States Patent [19]

Hay

[11] Patent Number: 4,969,935
[45] Date of Patent: Nov. 13, 1990

[54] PROCESS FOR TREATING A GASEOUS MIXTURE BY ADSORPTION

[75] Inventor: Léon Hay, Paris, France

[73] Assignee: L'Air Liquide, Societe Anonyme pour l'Etude et l'Exploitation des Procedes Georges Claude, Paris, France

[21] Appl. No.: 375,465

[22] Filed: Jul. 5, 1989

[30] Foreign Application Priority Data

Jul. 8, 1988 [FR] France .................. 88 09312

[51] Int. Cl.⁵ .................................. B01D 53/04
[52] U.S. Cl. ............................. 55/26; 55/31; 55/33; 55/62; 55/68; 55/75
[58] Field of Search ............. 55/25, 26, 58, 62, 68, 55/74, 75, 31, 33

[56] References Cited

U.S. PATENT DOCUMENTS

| | | | |
|---|---|---|---|
| 3,430,418 | 3/1969 | Wagner | 55/62 X |
| 3,564,816 | 2/1971 | Batta | 55/26 |
| 3,636,679 | 1/1982 | Batta | 55/62 X |
| 3,717,974 | 2/1973 | Batta | 55/58 |
| 3,738,087 | 6/1973 | McCombs | 55/58 |
| 3,796,022 | 3/1974 | Simonet et al. | 55/25 |
| 3,923,477 | 12/1975 | Armond et al. | 55/25 |
| 4,042,349 | 8/1977 | Baudouin et al. | 55/25 |
| 4,431,432 | 2/1984 | Amitani et al. | 55/26 |
| 4,512,779 | 4/1985 | Ha | 55/26 |
| 4,519,813 | 5/1985 | Hagiwara et al. | 55/26 |
| 4,640,694 | 2/1987 | Leitgeb et al. | 55/26 |
| 4,650,500 | 3/1987 | patel | 55/26 |
| 4,756,723 | 7/1988 | Sircar | 55/25 |
| 4,781,735 | 11/1988 | Tagawa et al. | 55/25 |
| 4,840,647 | 6/1989 | Hay | 55/26 |

FOREIGN PATENT DOCUMENTS

| | | | |
|---|---|---|---|
| 0248720 | 12/1987 | European Pat. Off. | 55/25 |
| 2579484 | 10/1986 | France | 55/25 |
| 2612083 | 9/1988 | France | 55/26 |
| 2154465 | 9/1985 | United Kingdom | 55/25 |
| 2155805 | 10/1985 | United Kingdom . | |

Primary Examiner—Robert Spitzer
Attorney, Agent, or Firm—Young & Thompson

[57] ABSTRACT

This PSA cycle comprises two successive pressure equilibration steps in the course of which gas is withdrawn in a cocurrent manner from an adsorber at the beginning of countercurrent decompression and respectively introduced in a countercurrent manner and then in a cocurrent manner in another adsorber at the beginning of recompression. Application in the production of impure oxygen from air of the atmosphere.

4 Claims, 1 Drawing Sheet

PROCESS FOR TREATING A GASEOUS MIXTURE BY ADSORPTION

The present invention relates to a process for treating a gaseous mixture by adsorption by a variation of pressure (PSA), of the type employing three adsorbers with, for each adsorber, a cycle comprising the following successive operational stages, the cycle being staggered from one line to the other by a duration T/3, in which T designates the duration of the cycle:

(a) an adsorption stage which is substantiallly isobaric at a high pressure of the cycle, this adsorption stage comprising the admission of the mixture into the adsorber through a first end, termed inlet end, of the adsorber, with circulation of the mixture in the adsorber and a simultaneous withdrawal at the other end, termed the outlet end, of the adsorber of a fraction enriched with one of the constituents a part of which forms a production gas, the direction of circulation in the adsorber in the course of this adsorption stage being termed cocurrent;

(b) a desorption stage starting with a countercurrent decompression to a low pressure of the cycle, this stage comprising an initial step (b1) of equilibration of pressures in the course of which the gas is withdrawn in a cocurrent manner simultaneously with the countercurrent decompression and is transferred into another adsorber at the beginning of the stage for raising pressure (c) described hereinafter, and (c) a pressure raising stage up to the return to the high pressure, this stage comprising an initial step (c1) for equilibrating pressures in the course of which the adsorber receives gas coming from another adsorber in the desorption step (b1).

The invention is in particular applicable to the production of air enriched with oxygen up to an oxygen content of about 95%, in particular between about 90 and 95%, from air of the atmosphere or, more generally, from a gaseous mixture essentially constituted by oxygen, nitrogen and argon.

A process of this type is described in FR-A- No. 2,579,484. The object of the invention is to provide a process for obtaining a content of oxygen which is just as high with an improved oxygen extraction yield.

For this purpose, the invention provides a process of the aforementioned type, wherein the equilibrating step (c1) is itself divided into two sub-steps, namely a first sub-step (c11) during which said gas is introduced in a countercurrent manner into the adsorber and a second sub-step (c12) during which said gas is introduced in a cocurrent manner into the adsorber.

In the present description, "equilibrating" is intended to mean an operation consisting in connecting two adsorbers having different pressures for the purpose of reducing the difference of the pressures; this operation may be pursued until the pressures are rendered equal or interrupted before obtaining this equalization.

Preferably, the desorption stage (b) comprises a final elution step (b2) at the low pressure of the cycle in the course of which the gas withdrawn at the outlet end of another adsorber in the adsorption stage (a) is introduced in a countercurrent manner into the adsorber while gas is withdrawn from the inlet end of this adsorber.

Figure 2:
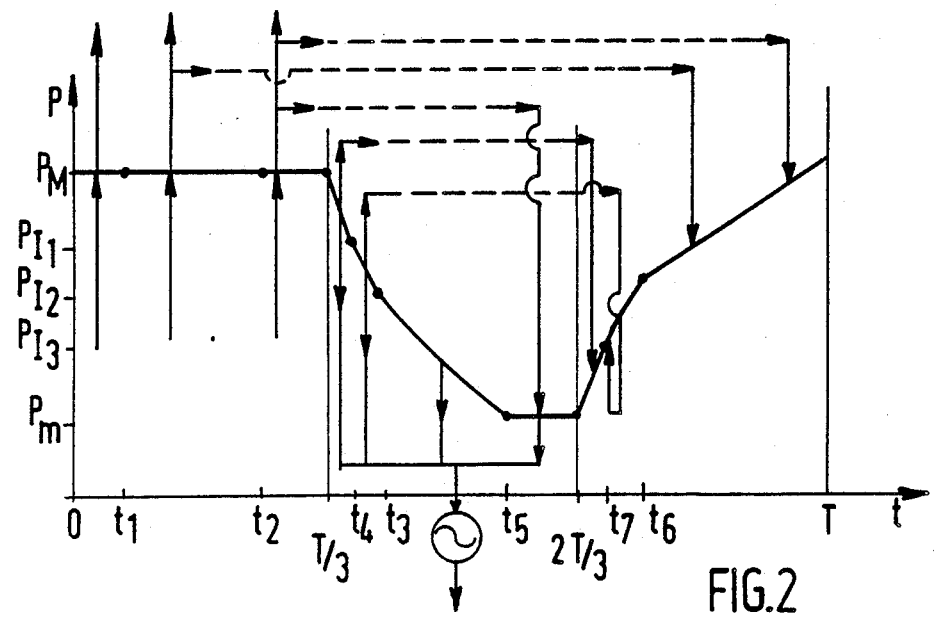

An example of how the invention may be carried out will now be described with reference to the following drawings in which:

FIG. 1 is a diagram of a plant for carrying out a process according to the invention, and FIG. 2 is a diagram illustrating the operation of this plant.

The plant in FIG. 1 is intended to produce air enriched with oxygen at a content preferably between about 90 and 95% from non-purified air of the atmosphere. It comprises three adsorbers 1 to 3, an inlet line 4 provided with a fan or blower 5, a pumping line 6 provided with a vacuum pump 7, and an enriched air producing line 8. Each adsorber has a cylindrical configuration and includes a lower inlet 1A to 3A and an upper outlet 1B to 3B. The adsorbers are filled with an adsorbent which preferentially adsorbs nitrogen relative to oxygen and argon, in particular a molecular sieve of the type 5A or 13X. Optionally, each adsorber may include at its base a layer of another adsorbent having a dessication action, in particular alumina or silica gel.

The line 4 is connected to the inlet of each adsorber through a respective valve 9-1 to 9-3. Likewise, the line 6 is connected to the inlet of each adsorber through a respective valve 10-1 to 10-3. The line 8 is connected to the outlet of each adsorber through a respective valve 11-1 to 11-3.

A first line 12 for withdrawing air enriched with oxygen, equipped with a flow control means 13, connects the line 8 to the outlet of each adsorber through a respective valve 14-1 to 14-3. Likewise, a second line 15 for withdrawing air enriched with oxygen, provided with a flow control means 16, connects the line 8 to the outlet of each adsorber through a respective valve 17-1 to 17-3.

Furthermore, a decompression line 18 may be connected to each adsorber outlet through a respective valve 19-1 to 19-3; a countercurrent recompression line 20 may be connected to each adsorber outlet through a respective valve 21-1 to 21-3 and is provided with a flow regulating means 22; and a cocurrent recompression line 23 may be connected to each adsorber inlet through a respective valve 24-1 to 24-3 and is provided with a flow regulating means 25.

By means of this plant, there is carried out for each adsorber a cycle which is illustrated in FIG. 2 with reference to the adsorber 1. If T designates the duration of the cycle, the operation of the adsorber 2 is deduced therefrom by staggering in time T/3 and that of the adsorber 3 by staggering in time 2T/3. In the illustrated embodiment, there may be chosen for example a cycle duration of 1 minute to a few minutes.

In FIG. 2, in which the times t are plotted as abscissae and the absolute pressures P are plotted as ordinates, the lines the orientations of which are indicated by arrows indicate the movements and destinations of the gaseous currents; when the arrows are parallel to the axis of the ordinates they indicate, in addition, the direction of circulation in an adsorber: when an arrow is in the direction of increasing ordinates (toward the upper part of the diagram), the direction of the current in the adsorber is cocurrent; if the arrow pointing upward is located below the line indicating the pressure in the adsorber, the current enters the adsorber through the inlet end of the adsorber; if the arrow pointing upward is located above the line indicating the pressure, the current issues from the adsorber through the outlet end of the adsorber, the inlet and outlet end being respectively those of the gas to be treated by the considered adsorber and of the gas withdrawn from this adsorber in the adsorption stage; when an arrow is in the direction of decreasing ordinates (downwardly in the diagram), the direction of the current in the adsorber is countercurrent. If the downwardly pointing arrow is located below the line indicating the pressure of the adsorber, the current issues from the adsorber through the inlet end of the adsorber; if the downwardly pointing arrow is located above the line indicating the pressure, the current enters the adsorber through the outlet end of the adsorber, the inlet and outlet ends being always those of the gas to be treated and of the gas withdrawn in the adsorption stage. Furthermore, there have been indicated in full lines the gaseous currents which concern exclusively an adsorber and in dotted lines the gaseous currents coming from or travelling toward other adsorbers.

The complete cycle will now be described in respect of an adsorber, for example the adsorber 1, with reference to FIGS. 1 and 2. In the embodiment of FIG. 2, the cycle evolves between two extreme pressures, namely a maximum pressure PM between the atmospheric pressure and 1.2 bars (absolute), and a minimum pressure Pm between 100 and 400 mb, which explains the use of the blower 5 and the vacuum pump 7.

The cycle of FIG. 2 comprises:

(a) from $t = 0$ to $T/3$, an isobaric adsorption stage at pressure PM in the course of which the air of the atmosphere to be treated is admitted at the inlet of the adsorber and circulates in a cocurrent manner in the latter, while gas (air enriched with oxygen) is withdrawn at the outlet of the adsorber. This stage is divided into three steps:

(a1) from $t = 0$ to t1, the whole of the withdrawn gas constitutes production gas, i.e. air enriched with 95% oxygen (which may be designated hereinafter by the simple word "oxygenated");

(a2) from t1 to t2, a part of the withdrawn gas constitutes production gas and the remainder is transferred to the outlet of another adsorber at the beginning of the third recompression step (c2) described hereinafter;

(a3) from t2 to $T/3$, a part of the withdrawn gas constitutes production gas, another part of this gas is transferred to the outlet of another adsorber at the end of the third recompression step (c2) described hereinafter, and the remainder of this gas is transferred to the outlet of the third adsorber in the elution stage (b3) described hereinafter;

(b) from $T/3$ to $2T/3$, a desorption stage in the course of which the gas is withdrawn in a countercurrent manner by the vacuum pump 7 and is divided into three steps:

(b1) from $T/3$ to t3, gas is withdrawn at the outlet of the adsorber simultaneously with the countercurrent pumping; this step is itself subdivided into two sub-steps:

(b11) from $T/3$ to t4 <t3, the gas withdrawn at the outlet of the adsorber is transferred to the outlet of another adsorber in the first recompression sub-step by equilibration of pressures (c11) described hereinafter; this sub-step terminates when the pressure has reached a first intermediate value PI1;

(b12) from t4 to t3, the gas withdrawn at the outlet of the adsorber is transferred to the inlet of the same adsorber in a second recompression sub-step by equilibration of pressures (c12) described hereinafter; this sub-step terminates in a second intermediate pressure PI2 <PI1;

(b2) from t3 to t5, solely the countercurrent pumping is continued until the low pressure Pm of the cycle is reached;

(b3) this optional step consists in an elution at low pressure Pm by gas coming from another adsorber in the third adsorption step (a3); this gas is introduced in a countercurrent manner and gas is withdrawn through the inlet of the adsorber for effecting a purge at a pressure of around Pm;

(c) from $2T/3$ to T, a pressure raising stage divided into two steps:

(c1) from $2T/3$ to t6, a partial recompression step by equilibration of pressures in the course of which the adsorber receives gas coming from the outlet of another adsorber in a first recompression step (b1). This step is itself subdivided into two sub-steps:

(c11) from $2T/3$ to t7 <t6, the recompression gas, very rich in oxygen, is introduced in a countercurrent manner, the inlet of the adsorber being closed; this sub-step terminates when the pressure is raised to a third intermediate value PI3 <PI2, and (c12) from t7 to t6, the recompression gas, which is less rich in oxygen, is introduced in a cocurrent manner, the outlet of the adsorber being closed, until the pressure is raised to the value PI2;

(c2) from t6 to T, the adsorber undergoes a final countercurrent recompression by means of gas withdrawn from the outlet of another adsorber in the adsorption step (a2) then (a3).

As a modification, the cycle may be transposed to other pressure fields, for example between a high pressure of 3 to 5 bars (absolute) and a low pressure of around atmospheric pressure.

The described cycle affords important advantages:

the oxygen extraction yield defined as the ratio of the quantity of oxygen produced to that contained in the incoming air, is high, owing to the integral recycling of the two successive fractions enriched with oxygen, withdrawn in decompression in a cocurrent manner after the adsorption stage, during step (b1);

the quality of the oxygen production is maintained at a high level (up to 95%) owing to the readmission in different circulation directions of the fractions recycled in the course of the two partial recompressions (c11) and (c12), the first fraction, constituted by a gas very enriched with oxygen, being introduced through the outlet end which is that of the oxygen production of the adsorber, and the second fraction, which is less enriched with oxygen than the preceding gas, comprising all or a part of the nitrogen adsorption front, being introduced through the inlet end which is that for the admission of air of the adsorber;

the consumption of energy of the plant is optimized owing to the maintenance of a countercurrent extraction of the residual gas in each adsorber during a duration equal to ⅓ of the time of the cycle, which, in the case of an operation with regeneration in depression, ensures a continuous utilisation of the vacuum pump in active gas extraction service in the adsorbers.

Note also that the cycle maintains an air admission flow during ⅓ of the time of the cycle in each adsorber, which results in a continuous admission of air to be treated in the plant and an optimization of the corresponding machine (blower or compressor).

As a modification, in order to regulate the enriched air flows employed as production and recycled in steps (b3) and (c2), a reservoir storing enriched air issuing from the adsorbers at stage (a) may be employed.

I claim:

1. Process for treating a gaseous mixture of constituents by pressure swing adsorption, the process comprising providing three, and no more than three, adsorbers, and performing for each adsorber, a cycle comprising the following successive operational stages, the cycle being staggered from one adsorber to the other by a duration T/3 in which T designates the duration of the cycle:

(a) a substantially isobaric adsorption stage at a high pressure of the cycle, said adsorption stage comprising admission of the mixture into the adsorber through a first end, termed inlet end, of the adsorber, with circulation of the mixture in the adsorber and simultaneous withdrawal at the other end, termed outlet end, of the adsorber of an enriched fraction enriched with one of the constituents of which a part forms a production gas, the direction of circulation in the adsorber in the course of said adsorption stage being termed cocurrent;

(b) a desorption stage comprising at least an initial decompression step from said high pressure to a low pressure of the cycle, said decompression step comprising an initial sub-step (b1) for equilibrating pressures in the course of which gas is withdrawn from said adsorber in a cocurrent manner simultaneously with decompression by countercurrent withdrawal of gas from said adsorber and is transferred into another adsorber which is at the beginning of a pressure raising stage (c) described hereinafter; and (c) a recompression stage for raising pressure to said high pressure, said recompression stage (c) comprising an initial pressure-equilibrating step in the course of which the first-mentioned adsorber receives a received gas coming from another adsorber which is in said initial sub-step (b1), said initial pressure-equilibrating step being divided into two successive sub-steps, namely a first sub-step during which said received gas is introduced in a countercurrent manner into the first-mentioned adsorber, and subsequently a second sub-step during which said received gas is introduced in a cocurrent manner into the first-mentioned adsorber.

2. Process according to claim 1, wherein the desorption stage comprises a final elution step at the low pressure of the cycle in the course of which gas withdrawn from the outlet end of another adsorber which is in an adsorption stage is introduced in a countercurrent manner into the first-mentioned adsorber while gas is withdrawn from the inlet end of said first-mentioned adsorber.

3. Process according to claim 1, wherein the pressure raising stage comprises a final step during which is first-mentioned adsorber is recompressed in a countercurrent manner until said high pressure of the cycle is reached by gas withdrawn at the outlet end of another adsorber which is in the adsorption stage.

4. Process according to claim 1, wherein the gaseous mixture is essentially constituent by oxygen, nitrogen, and argon, and said enriched fraction contains substantially 90 to 95% of oxygen.

* * * * *